(12) United States Patent
Yamazaki

(10) Patent No.: US 8,582,073 B2
(45) Date of Patent: Nov. 12, 2013

(54) METHOD OF MANUFACTURING LIQUID CRYSTAL PANEL, GLASS SUBSTRATE FOR LIQUID CRYSTAL PANEL, AND LIQUID CRYSTAL PANEL INCLUDING THE SAME

(75) Inventor: Ikushi Yamazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 57 days.

(21) Appl. No.: 13/258,540

(22) PCT Filed: Feb. 24, 2010

(86) PCT No.: PCT/JP2010/052849
§ 371 (c)(1),
(2), (4) Date: Sep. 22, 2011

(87) PCT Pub. No.: WO2010/125847
PCT Pub. Date: Nov. 4, 2010

(65) Prior Publication Data
US 2012/0019764 A1    Jan. 26, 2012

(30) Foreign Application Priority Data
Apr. 30, 2009  (JP) .................................. 2009-110689

(51) Int. Cl.
*G02F 1/13* (2006.01)
*G02F 1/1335* (2006.01)

(52) U.S. Cl.
USPC ........... 349/159; 349/122; 349/138; 349/139; 349/187

(58) Field of Classification Search
USPC ........................................................ 349/159
See application file for complete search history.

(56) References Cited

U.S. PATENT DOCUMENTS 5,361,150 A    11/1994 Noguchi
5,447,874 A *  9/1995 Grivna et al. ................. 438/174
(Continued)

FOREIGN PATENT DOCUMENTS

EP    1 921 490 A1    5/2008
JP    04-077715 A     3/1992
(Continued)

OTHER PUBLICATIONS

Nakatani et al., Semiconductor Device, Method for Manufacturing the Same and Image Display, WIPO Publication WO2009019865.*
Official Communication issued in corresponding Russian Patent Application No. 2011148603, mailed on Nov. 2, 2012.
Official Communication issued in International Patent Application No. PCT/JP2010/052849, mailed on May 18, 2010.

*Primary Examiner* — Edward Glick
*Assistant Examiner* — Alexander Gross
(74) *Attorney, Agent, or Firm* — Keating & Bennet, LLP

(57) ABSTRACT

A method of manufacturing a liquid crystal panel includes the steps of simultaneously forming a gate electrode of a TFT and a lower layer of a marking pad, simultaneously forming a gate insulating film of the TFT and a protective insulating film covering the lower layer, performing various film deposition processes and patterning processes while the lower layer is covered with the protective insulating film, exposing a main surface of the lower layer except for its periphery by removing at least a part of the protective insulating film, simultaneously forming a pixel electrode and an upper layer of the marking pad covering the main surface of the lower layer in a portion not covered with the protective insulating film, and providing marking by providing a through hole by irradiating the marking pad with laser beams.

3 Claims, 14 Drawing Sheets

(56) References Cited

U.S. PATENT DOCUMENTS

| | | | |
|---|---|---|---|
| 6,184,960 B1 * | 2/2001 | Sawayama et al. | 349/139 |
| 6,395,457 B1 * | 5/2002 | Park et al. | 430/318 |
| 6,512,503 B1 * | 1/2003 | Kim et al. | 345/87 |
| 6,734,931 B2 * | 5/2004 | Yu | 349/106 |
| 7,095,458 B2 * | 8/2006 | Kim et al. | 349/1 |
| 7,629,613 B2 | 12/2009 | Sohn et al. | |
| 2003/0225473 A1 | 12/2003 | Yamazaki | |
| 2004/0056993 A1 | 3/2004 | Kim et al. | |
| 2006/0033102 A1 | 2/2006 | Kim | |
| 2006/0275618 A1 | 12/2006 | Kugimiya et al. | |
| 2010/0171917 A1 * | 7/2010 | Park et al. | 349/139 |

FOREIGN PATENT DOCUMENTS

| | | |
|---|---|---|
| JP | 06-051328 A | 2/1994 |
| JP | 10-278422 A | 10/1998 |
| JP | 11-109412 A | 4/1999 |
| JP | 2004-072075 A | 3/2004 |
| JP | 2006-079036 A | 3/2006 |
| KR | 10-2006-0127794 A | 12/2006 |
| KR | 10-2008-0002268 A | 1/2008 |

* cited by examiner

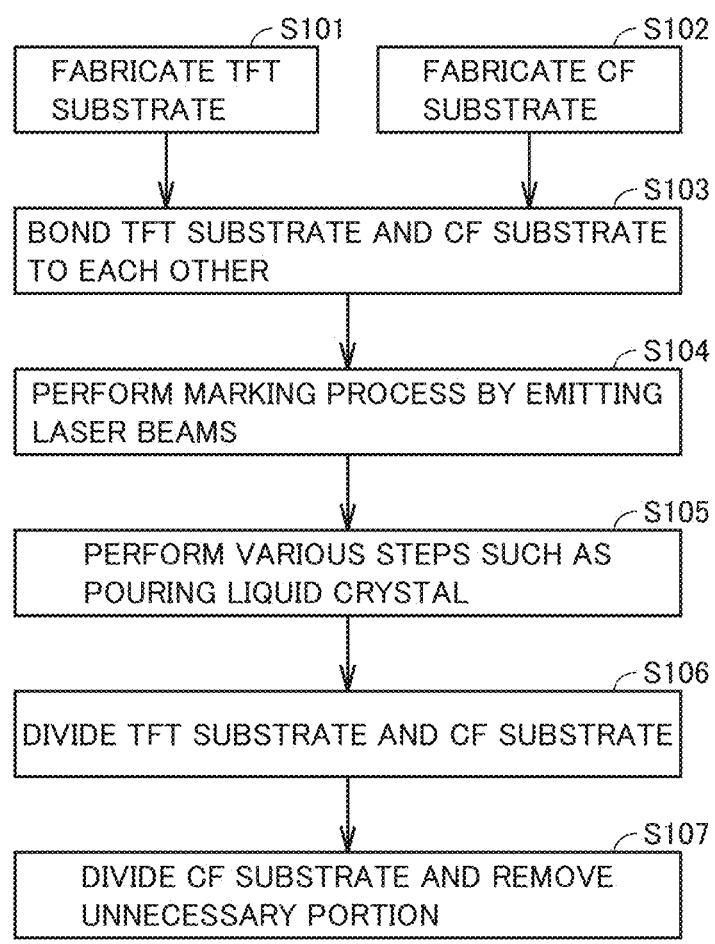

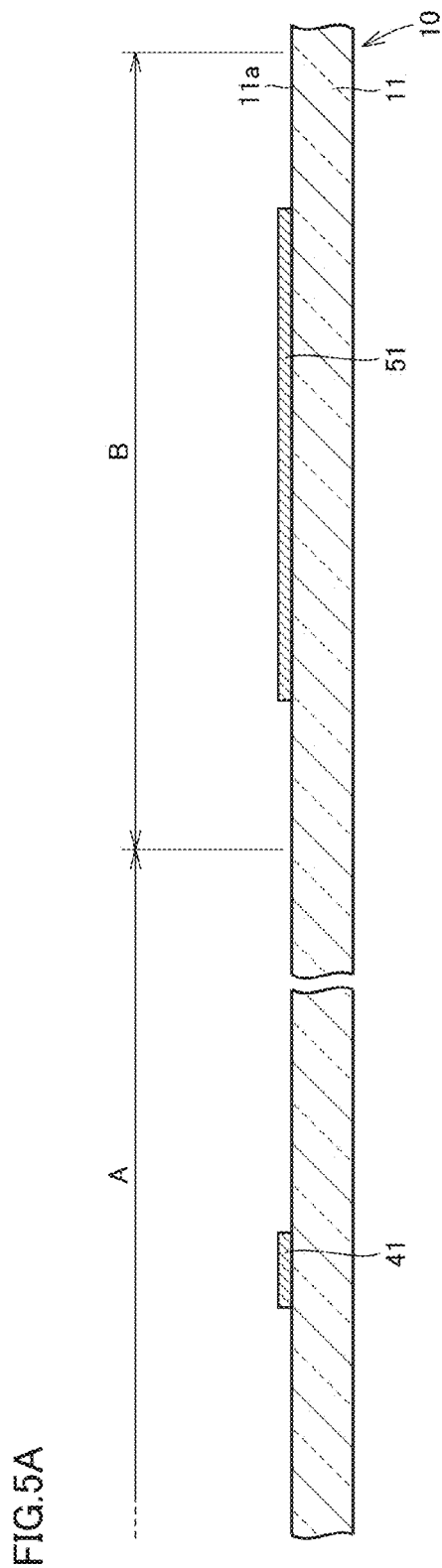

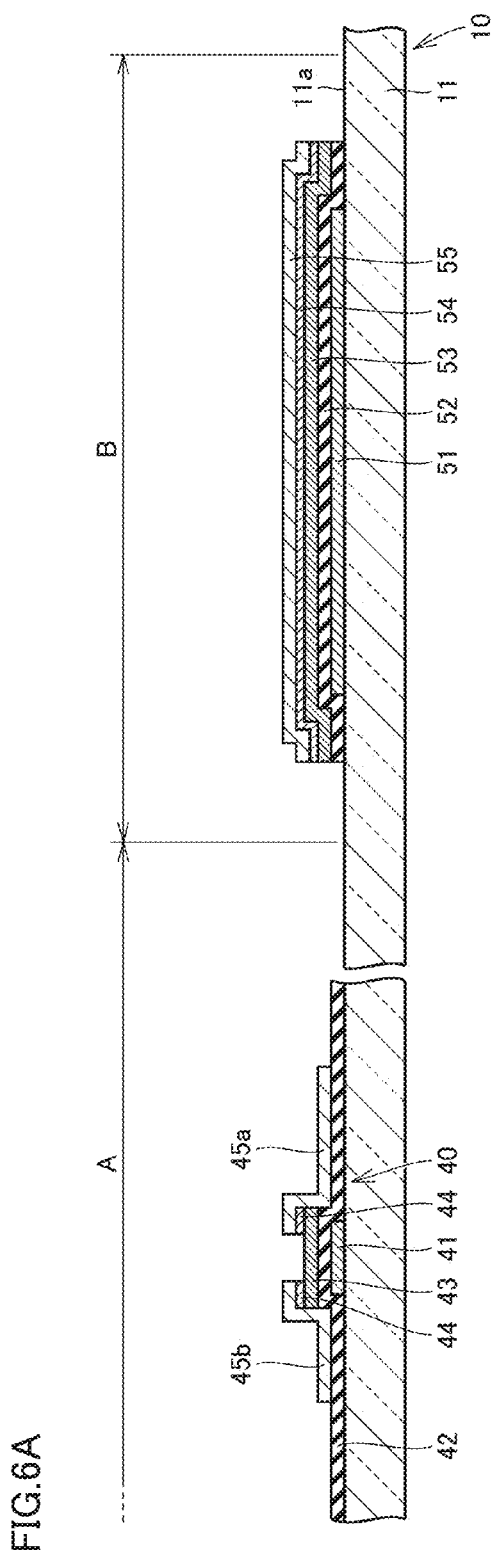

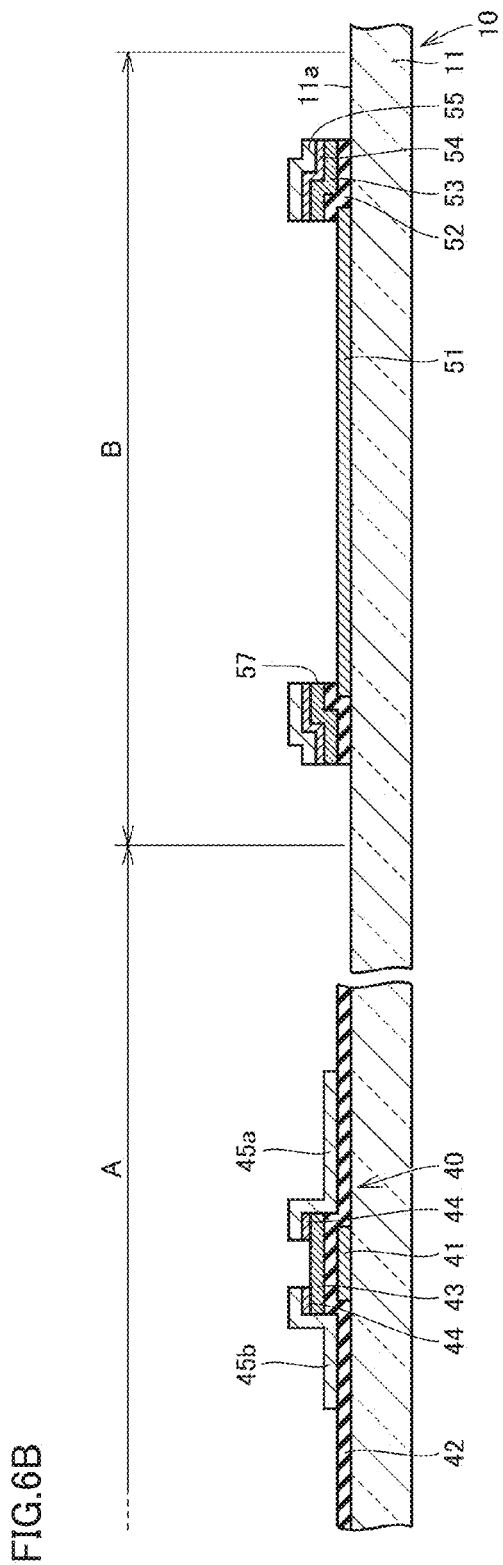

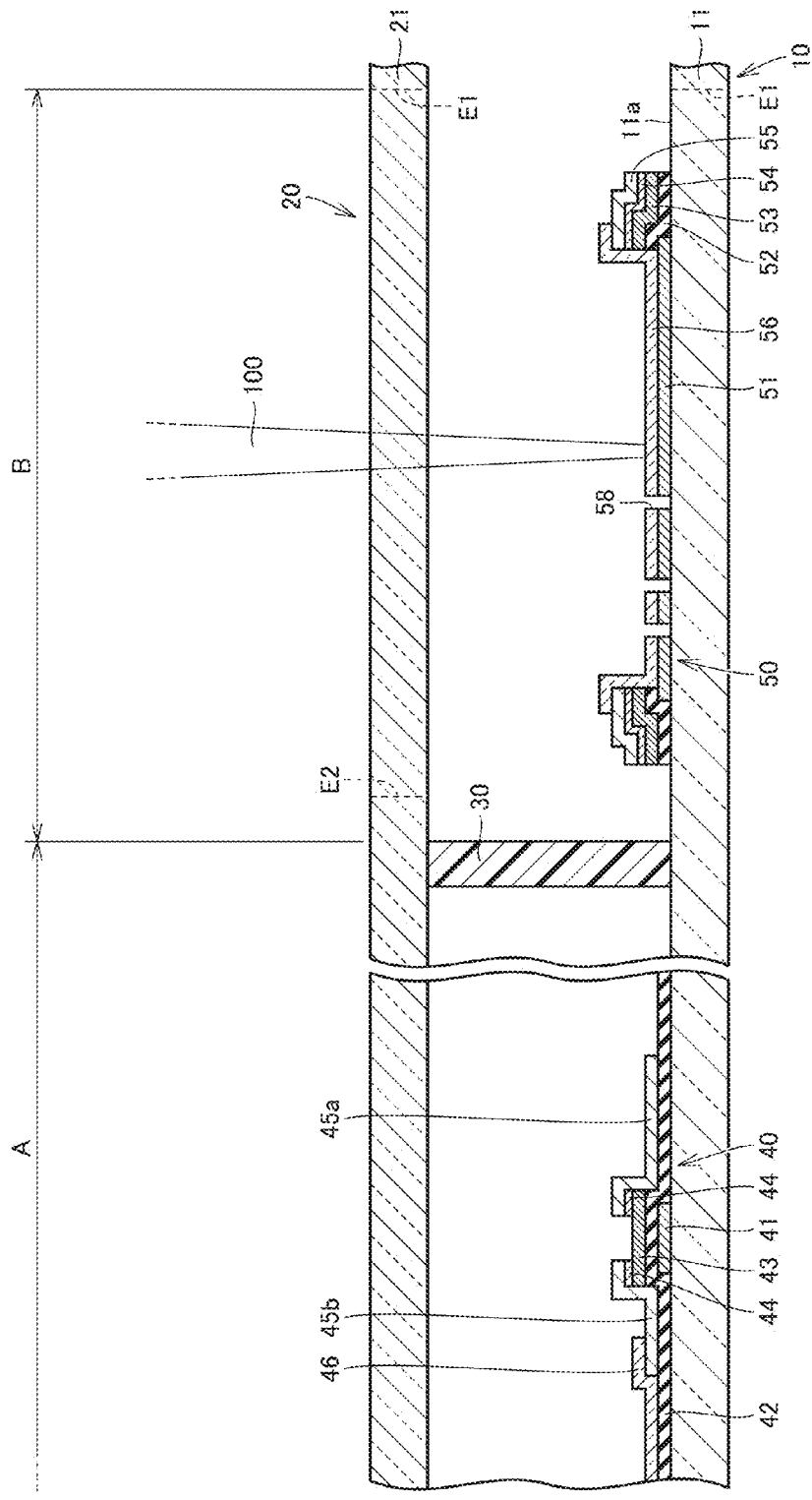

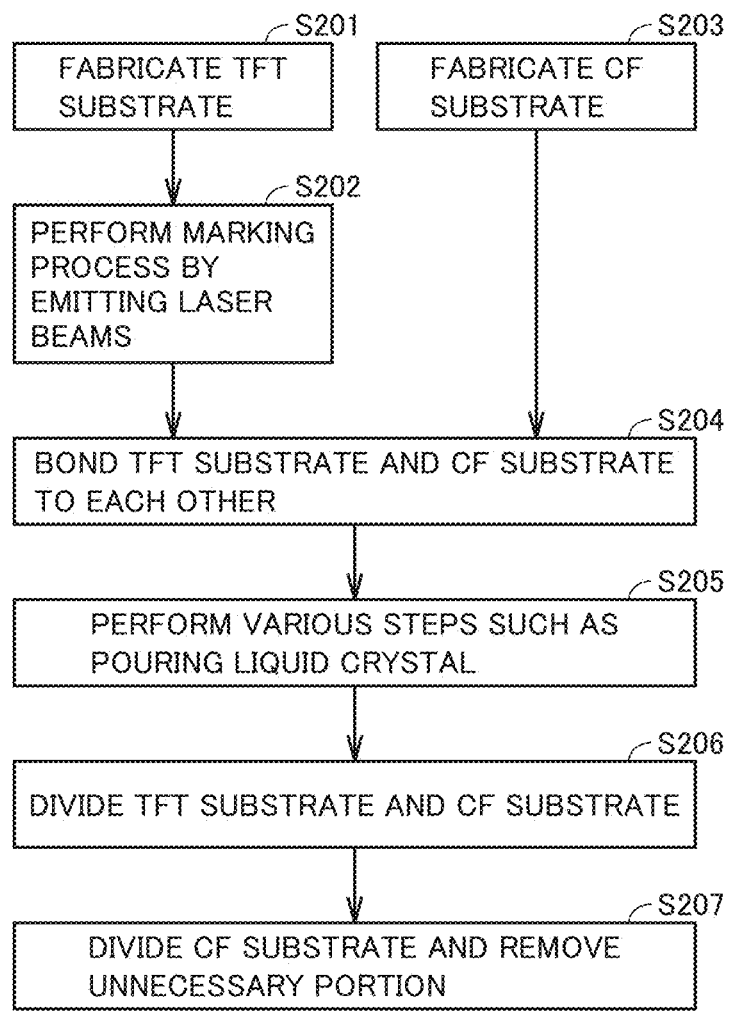

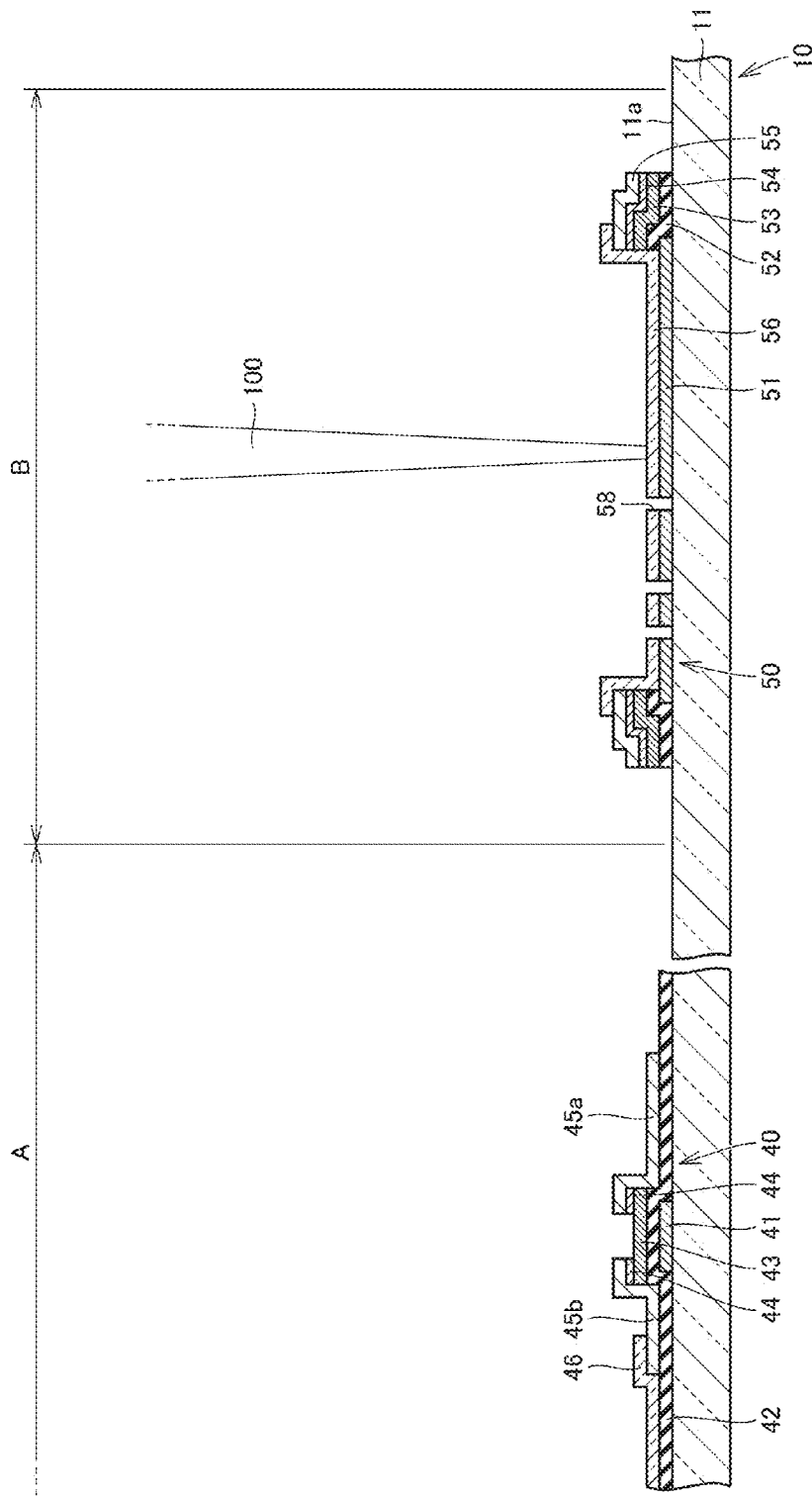

METHOD OF MANUFACTURING LIQUID CRYSTAL PANEL, GLASS SUBSTRATE FOR LIQUID CRYSTAL PANEL, AND LIQUID CRYSTAL PANEL INCLUDING THE SAME

TECHNICAL FIELD

The present invention relates to a method of manufacturing a liquid crystal panel including the step of marking through laser marking, various types of information in a marking pad provided on a glass substrate for the liquid crystal panel, and also to a glass substrate for a liquid crystal panel including a marking pad having a marking region suitable for laser marking as well as a liquid crystal panel including the same.

BACKGROUND ART

In general, a liquid crystal panel is suitably used in a display for a liquid crystal television or a personal computer serving as a display apparatus, and it has remarkably widely been used in recent years. In the liquid crystal panel, out of necessity in management during production or necessity in maintenance after shipment, various types of information such as serial information and information on use thereof are marked. Laser marking is normally suitably utilized for this marking, and the various types of information described above are marked during a production process by irradiating a glass substrate for a liquid crystal panel, which is a component of the liquid crystal panel, with laser beams.

As a method of marking various types of information in a glass substrate for a liquid crystal panel by utilizing laser marking, for example, a marking method by irradiating an ITO (Indium Tin Oxide) film formed on a surface of a glass substrate with laser beams (see Japanese Patent Laying-Open No. 6-51328 (Patent Literature 1)), a marking method by irradiating an orientation film formed on a surface of a glass substrate with laser beams (see Japanese Patent Laying-Open No. 10-278422 (Patent Literature 2)), a marking method by irradiating a metal film formed on a surface of a glass substrate with laser beams, and the like have been known Among these, in the marking method by irradiating a metal film formed on a surface of a glass substrate with laser beams, specifically, marking is provided in the glass substrate by providing a marking pad by forming a metal film in a peripheral portion of the glass substrate not serving as a liquid crystal display portion, irradiating this marking pad with laser beams, and thus forming a through hole in the marking pad. It is noted that various types of information thus marked are marked in the glass substrate as a two-dimensional data code with the information being data-matrixed, and the information is read by using any of a reflection camera and a transmission camera.

CITATION LIST

Patent Literature

PTL 1: Japanese Patent Laying-Open No. 6-51328
PTL 2: Japanese Patent Laying-Open No. 10-278422

SUMMARY OF INVENTION

Technical Problem

The following two types are assumed as process flows in a case where marking is provided by irradiating a metal film formed on a glass substrate for a liquid crystal panel with laser beams. The first process flow is called a single-substrate process, and it is a process flow in which, prior to bonding between a TFT (Thin Film Transistor) substrate which is a glass substrate to be provided with marking and a CF (Color Filter) substrate to which a color filter has been bonded, various types of information are marked by directly irradiating a marking pad provided on the TFT substrate with laser beams and thereafter the TFT substrate and the CF substrate are bonded to each other. The second process flow is called a multiple-substrate process, and it is a process flow in which, after the TFT substrate and the CF substrate are bonded to each other, various types of information are marked by irradiating the marking pad provided on the TFT substrate with laser beams through the CF substrate.

In adopting the single-substrate process described above, since the marking pad is directly irradiated with laser beams, definition of formed marking (that is, a shape or a size of a through hole, a degree of darkening around the through hole, and the like) can be suited for reading with the use of a transmission camera or a reflection camera.

On the other hand, in adopting the multiple-substrate process described above, since a laser marking process is performed after bonding between the TFT substrate and the CF substrate, the number of produced TFT substrates and CF substrates fabricated concurrently can be managed to be in good balance and an effect of enabling efficient manufacturing of liquid crystal panels is achieved.

Meanwhile, in a case where a marking pad is formed from a metal film as described above, various processes such as a film deposition process or an etching process for forming a TFT may be performed after the metal film is formed. In such a case, the metal film forming the marking pad may corrode and deteriorate during the film deposition process or the etching process. If such corrosion occurs, the marking pad deteriorates and accordingly definition of formed marking will disadvantageously be low. Then, recognition error in reading with the use of a transmission camera or a reflection camera described above will result.

Therefore, an object of the present invention is to provide a method of manufacturing a liquid crystal panel capable of effectively preventing corrosion of a marking pad including a metal film provided on a glass substrate for a liquid crystal panel during a process for producing liquid crystal panels.

In addition, an object of the present invention is to provide a glass substrate for a liquid crystal panel including a marking pad suited for a laser marking process and a liquid crystal panel.

Solution to Problem

A method of manufacturing a liquid crystal panel according to the present invention includes the following steps (A) to (G):

(A) Preparing a glass substrate for a liquid crystal panel including a portion serving as a liquid crystal display portion and a peripheral portion not serving as the liquid crystal display portion;

(B) Forming a gate electrode of a TFT in the portion serving as the liquid crystal display portion and forming a lower layer of a marking pad in the peripheral portion by forming and patterning a metal film on a main surface of the glass substrate for a liquid crystal panel;

(C) Forming a gate insulating film of the TFT in the portion serving as the liquid crystal display portion and forming a protective insulating film in contact with the lower layer so as to cover the lower layer of the marking pad in the peripheral portion by forming and patterning an insulating film on the main surface of the glass substrate for a liquid crystal panel;

(D) Performing various film deposition processes and patterning processes in the portion serving as the liquid crystal display portion and in the peripheral portion while a state that the lower layer of the marking pad is covered with the protective insulating film is maintained;

(E) Exposing a main surface of the lower layer of the marking pad except for its periphery by removing a part of the protective insulating film and at least a part of various films formed thereon;

(F) Forming a pixel electrode in the portion serving as the liquid crystal display portion and an upper layer of the marking pad to be in contact with the lower layer so as to cover the main surface of the lower layer of the marking pad in a portion not covered with the protective insulating film in the peripheral portion, by forming and patterning an ITO film on the main surface of the glass substrate for a liquid crystal panel; and (G) Providing marking by providing a through hole penetrating the upper layer and the lower layer of the marking pad by irradiating the marking pad with laser beams.

In the method of manufacturing a liquid crystal panel according to the present invention, the step of (B) forming a gate electrode and a lower layer of a marking pad described above may include the step of successively stacking and forming a plurality of metal films different in material.

The method of manufacturing a liquid crystal panel according to the present invention may further include the step of (H) subjecting respective main surfaces of the gate electrode and the lower layer of the marking pad to anodization treatment.

A glass substrate for a liquid crystal panel according to the present invention includes a portion serving as a liquid crystal display portion and a peripheral portion not serving as the liquid crystal display portion. A TFT is provided on a main surface of the portion serving as the liquid crystal display portion, and the TFT includes a metal film serving as a gate electrode, an insulating film serving as a gate insulating film, and an ITO film serving as a pixel electrode. A marking pad for providing marking by irradiation with laser beams is provided on a main surface of the peripheral portion, and the marking pad has a marking region formed of a stack constituted only of a metal film serving as a lower layer and an ITO film serving as an upper layer and a peripheral region including an insulating film covering a periphery of the metal film serving as the lower layer. The metal film serving as the gate electrode and the metal film serving as the lower layer are formed simultaneously in a single step, the insulating film serving as the gate insulating film and the insulating film forming the peripheral region are formed simultaneously in a single step, and the ITO film serving as the pixel electrode and the ITO film serving as the upper layer are formed simultaneously in a single step.

In the glass substrate for a liquid crystal panel according to the present invention, the gate electrode and the lower layer of the marking pad may be made of a film stack of a plurality of metal films different in material.

In the glass substrate for a liquid crystal panel according to the present invention, respective main surfaces of the gate electrode and the lower layer of the marking pad may be subjected to anodization treatment.

A liquid crystal panel according to the present invention includes any glass substrate for a liquid crystal panel described above.

Advantageous Effects Of Invention

According to the present invention, a method of manufacturing a liquid crystal panel with which corrosion of a marking pad including a metal film provided on a glass substrate for a liquid crystal panel in a process for producing liquid crystal panels is effectively prevented can be provided.

In addition, according to the present invention, a glass substrate for a liquid crystal panel including a marking pad suited for a laser marking process and a liquid crystal panel can be provided.

BRIEF DESCRIPTION OF DRAWINGS

FIG. 4 is a flowchart for illustrating a method of manufacturing a liquid crystal panel in one embodiment of the present invention.

FIG. 5A is a schematic cross-sectional view in a production process in a case where a liquid crystal panel is manufactured according to the method of manufacturing a liquid crystal panel in one embodiment of the present invention.

FIG. 6A is a schematic cross-sectional view in the production process in a case where a liquid crystal panel is manufactured according to the method of manufacturing a liquid crystal panel in one embodiment of the present invention.

FIG. 6B is a schematic cross-sectional view in the production process in a case where a liquid crystal panel is manufactured according to the method of manufacturing a liquid crystal panel in one embodiment of the present invention.

FIG. 8 is a schematic cross-sectional view in the production process in a case where a liquid crystal panel is manufactured according to the method of manufacturing a liquid crystal panel in one embodiment of the present invention.

FIG. 10 is a flowchart for illustrating another example of a method of manufacturing a liquid crystal panel in one embodiment of the present invention.

FIG. 11 is a schematic cross-sectional view in a production process in a case where a liquid crystal panel is manufactured according to another example of the method of manufacturing a liquid crystal panel in one embodiment of the present invention.

DESCRIPTION OF EMBODIMENTS

Figure 1:
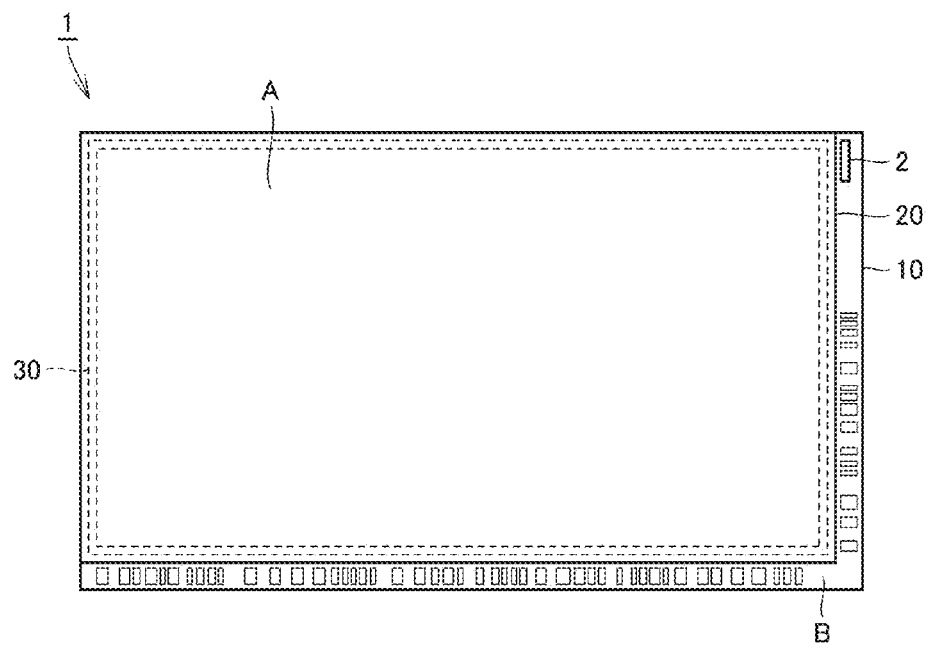
FIG. 1 is a schematic plan view of a liquid crystal panel in one embodiment of the present invention.

One embodiment of the present invention will be described hereinafter in detail with reference to the drawings. In the following, the same elements have the same reference characters allotted and description thereof will not be repeated.

Figure 2:
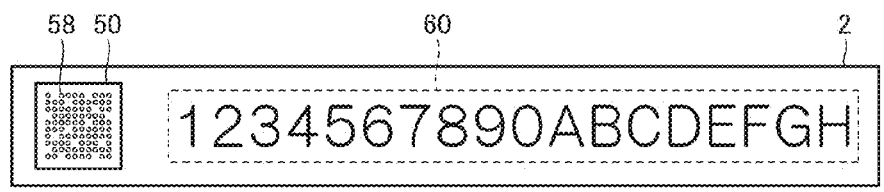
FIG. 2 is an enlarged schematic diagram of an information recording portion shown in FIG. 1.
Figure 3:
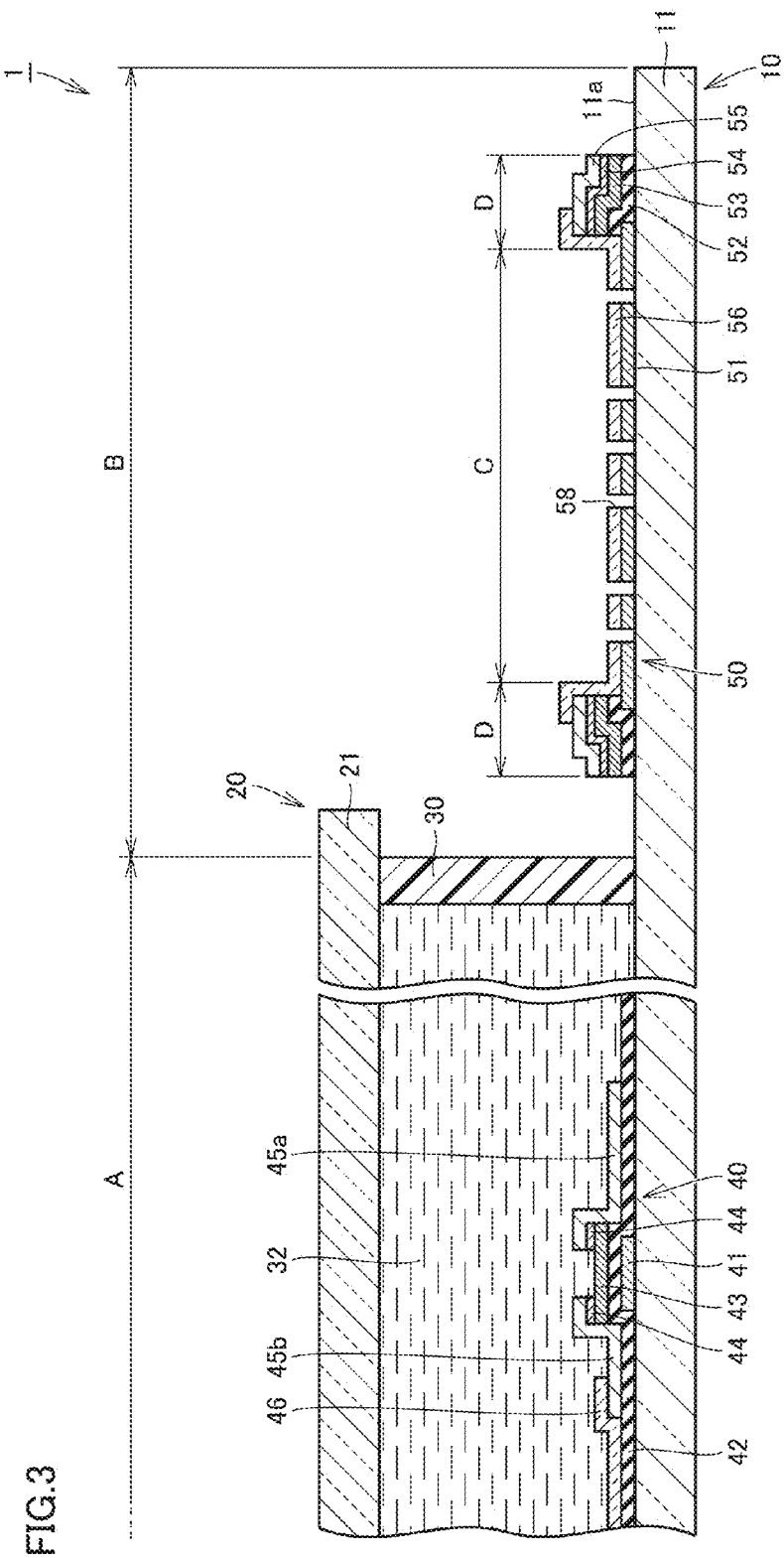
FIG. 3 is a schematic cross-sectional view of the liquid crystal panel in one embodiment of the present invention.

FIG. 1 is a schematic plan view of a liquid crystal panel in one embodiment of the present invention, and FIG. 2 is an enlarged schematic diagram of an information recording portion of the liquid crystal panel shown in FIG. 1. FIG. 3 is a schematic cross-sectional view of the liquid crystal panel shown in FIG. 1. Initially, a structure of a liquid crystal panel and a glass substrate for a liquid crystal panel in the present embodiment will be described with reference to these FIGS. 1 to 3.

As shown in FIGS. 1 and 3, a liquid crystal panel 1 in the present embodiment mainly includes a TFT substrate 10, a CF substrate 20, a sealing member 30, and a liquid crystal 32. Liquid crystal panel 1 in the present embodiment is what is called an active-matrix-type liquid crystal panel in which a plurality of display pixels arranged in matrix are individually controlled by TFTs provided for the display pixels.

TFT substrate 10 is also called an active matrix substrate, and it mainly has a glass substrate 11 serving as a base member, a plurality of TFTs 40 formed on a main surface 11a thereof, and a plurality of pixel electrodes 46 electrically connected to respective TFTs 40. TFT substrate 10 includes therein a portion A serving as a liquid crystal display portion for displaying an image and a peripheral portion B not serving as the liquid crystal display portion, and the plurality of TFTs 40 and pixel electrodes 46 described above are arranged in matrix in portion A serving as the liquid crystal display portion. It is noted that TFT substrate 10 (in some cases, glass substrate 11 serving as a base member for TFT substrate 10) corresponds to a first liquid crystal panel glass substrate.

CF substrate 20 is also called an opposing substrate, and it mainly has a glass substrate 21 serving as a base member, a color filter (not shown) bonded to a main surface thereof, and a counter electrode (not shown) formed on the color filter. CF substrate 20 has only a portion serving as the liquid crystal display portion. The color filter is bonded to the portion of glass substrate 21 to serve as the liquid crystal display portion, and a plurality of counter electrodes described above are arranged in matrix on a main surface of the color filter. It is noted that this CF substrate 20 (in some cases, glass substrate 21 serving as a base member for CF substrate 20) corresponds to a second liquid crystal panel glass substrate.

TFT substrate 10 and CF substrate 20 are bonded to each other by sealing member 30 such that they are opposed to each other at a prescribed distance (for example, approximately 5 μm). Sealing member 30 is provided to surround the liquid crystal display portion, and liquid crystal 32 is sealed in a space surrounded by this sealing member 30 and lying between TFT substrate 10 and CF substrate 20. Liquid crystal 32 has such a characteristic that its transmittance of light varies in accordance with an applied voltage, and it is located between pixel electrode 46 provided on TFT substrate 10 described above and the counter electrode provided on CF substrate 20 described above. It is noted that a not-shown orientation film is provided in a portion of TFT substrate 10 and CF substrate 20 facing liquid crystal 32.

At a prescribed position in peripheral portion B of TFT substrate 10 not serving as the liquid crystal display portion, an information recording portion 2 where various types of information are recorded is provided. As shown in FIG. 2, information recording portion 2 includes a marking pad 50 where various types of information are recorded in a form of a two-dimensional data code and a character data portion 60 where various types of information are recorded as character data. Out of them, in marking pad 50 where various types of information are recorded in the form of a two-dimensional data code, information is recorded as a through hole 58 provided in marking pad 50 by performing a laser marking process which will be described later.

As shown in FIG. 3, in portion A of TFT substrate 10 serving as the liquid crystal display portion, TFT 40 is provided on main surface 11a of glass substrate 11. TFT 40 has a gate electrode 41 electrically connected to a gate interconnection, a gate insulating film 42 formed to cover gate electrode 41, a first semiconductor layer 43 formed on gate electrode 41 with gate insulating film 42 being interposed, a second semiconductor layer 44 formed at a prescribed position on first semiconductor layer 43, and a source electrode 45a and a drain electrode 45b formed on second semiconductor layer 44.

Gate electrode 41 is formed from a single-layer metal film made, for example, of aluminum (Al), copper (Cu), tantalum (Ta), titanium (Ti), or the like. In addition, gate insulating film 42 is formed from a single-layer or multiple-layer insulating film made of silicon nitride (SiNx), silicon oxide (SiOx) or the like.

First semiconductor layer 43 is formed from an intrinsic semiconductor film made, for example, of amorphous silicon. In addition, second semiconductor layer 44 is formed from an impurity-added semiconductor film made, for example, of $n^+$ type amorphous silicon. It is noted that second semiconductor layer 44 functions as a contact layer between first semiconductor layer 43 and source electrode 45a and between first semiconductor layer 43 and drain electrode 45b.

Source electrode 45a and drain electrode 45b are formed from a single-layer or multiple-layer metal film made, for example, of aluminum, copper, tantalum, titanium, or the like. In addition, pixel electrode 46 is formed, for example, from an ITO film (that is, a mixed film of indium oxide ($In_2O_3$) and tin oxide ($SnO_2$)).

Meanwhile, in peripheral portion B of TFT substrate 10 not serving as the liquid crystal display portion, marking pad 50 is provided on main surface 11a of glass substrate 11. Marking pad 50 has a marking region C in which marking is provided and a peripheral region D surrounding marking region C, marking region C is formed of a stack constituted only of a metal film serving as a lower layer 51 and an ITO film serving as an upper layer 56, a periphery of the metal film serving as lower layer 51 is covered with a protective insulating film 52 in peripheral region D, and further, a first coating film 53 formed from a first semiconductor layer, a second coating film 54 formed from a second semiconductor layer, and a third coating film 55 formed from a metal film are located on protective insulating film 52.

The metal film serving as lower layer 51 is formed from a single-layer metal film made, for example, of aluminum, copper, tantalum, titanium, or the like. A main surface of the metal film serving as lower layer 51 (that is, a surface in contact with upper layer 56) may be subjected to anodization treatment. It is noted that lower layer 51 in marking region C in marking pad 50 and gate electrode 41 of TFT 40 described above are formed simultaneously and a material and a thickness of the former are the same as those of a metal film forming gate electrode 41 of TFT 40.

Upper layer 56 in marking region C in marking pad 50 and the pixel electrode connected to TFT 40 described above are formed simultaneously, and a material and a thickness of the former are the same as those of the ITO film forming pixel electrode 46 connected to TFT 40.

Protective insulating film 52 located in peripheral region D in marking pad 50 and gate insulating film 42 of TFT 40 described above are simultaneously formed, and a material and a thickness of the former are the same as those of gate insulating film 42 of TFT 40.

First coating film 53 and second coating film 54 located in peripheral region D in marking pad 50 as well as first semiconductor layer 43 and second semiconductor layer 44 of TFT 40 described above are simultaneously formed, and a material and a thickness of the former are the same as those of first semiconductor layer 43 and second semiconductor layer 44 of TFT 40 respectively.

Third coating film 55 located in peripheral region D in marking pad 50 as well as source electrode 45a and drain electrode 45b of TFT 40 described above are simultaneously formed, and a material and a thickness of the former are the same as those of source electrode 45a and drain electrode 45b of TFT 40.

Here, in marking region C in marking pad 50, a plurality of through holes 58 penetrating the ITO film serving as upper layer 56 and the metal film serving as lower layer 51 are provided. This through hole 58 implements a two-dimensional data code in which various types of information such as serial information and information on use have been coded and the information is read by using a transmission camera or a reflection camera.

Specifically, in a case where a transmission camera is used, various types of information are read by detecting light that passes through TFT substrate 10 as it passes through through hole 58 provided in marking region C in marking pad 50. On the other hand, in a case where a reflection camera is used, various types of information are read by detecting through hole 58 provided in marking region C in marking pad 50 and darkening produced therearound in distinction from a surrounding ground by making use of difference in contrast.

FIG. 4 is a flowchart for illustrating a method of manufacturing a liquid crystal panel in the present embodiment, and FIGS. 5A to 8 are schematic cross-sectional views in a production process in a case where a liquid crystal panel is manufactured according to the method of manufacturing a liquid crystal panel in the present embodiment. A method of manufacturing a liquid crystal panel in the present embodiment will now be described with reference to these FIGS. 4 to 8.

As shown in FIG. 4, in the method of manufacturing a liquid crystal panel in the present embodiment, initially, fabrication of TFT substrate 10 (step S101) and fabrication of CF substrate 20 paired with TFT substrate 10 (step S102) are concurrently performed. In fabricating CF substrate 20, it is fabricated by preparing glass substrate 21, bonding a color film thereto and forming counter electrodes, and further forming an orientation film. In fabricating TFT substrate 10, specifically, the following process is performed.

Initially, as shown in FIG. 5A, glass substrate 11 including portion A serving as the liquid crystal display portion and peripheral portion B not serving as the liquid crystal display portion is prepared and a metal film is formed thereon and patterned. Thus, gate electrode 41 of TFT 40 is formed in portion A serving as the liquid crystal display portion and lower layer 51 in marking pad 50 is formed in peripheral portion B. More specifically, an aluminum film is formed on main surface 11a of glass substrate 11, for example, with sputtering, and the aluminum film is patterned with photolithography to thereby form gate electrode 41 and lower layer 51. It is noted that dry etching using, for example, $BCl_3+Cl_2$, $CF_4(+O_2)$ or the like can be made use of as an etching process in photolithography. Here, the main surface of the formed aluminum film may be subjected to anodization treatment as required.

Figure 5B:
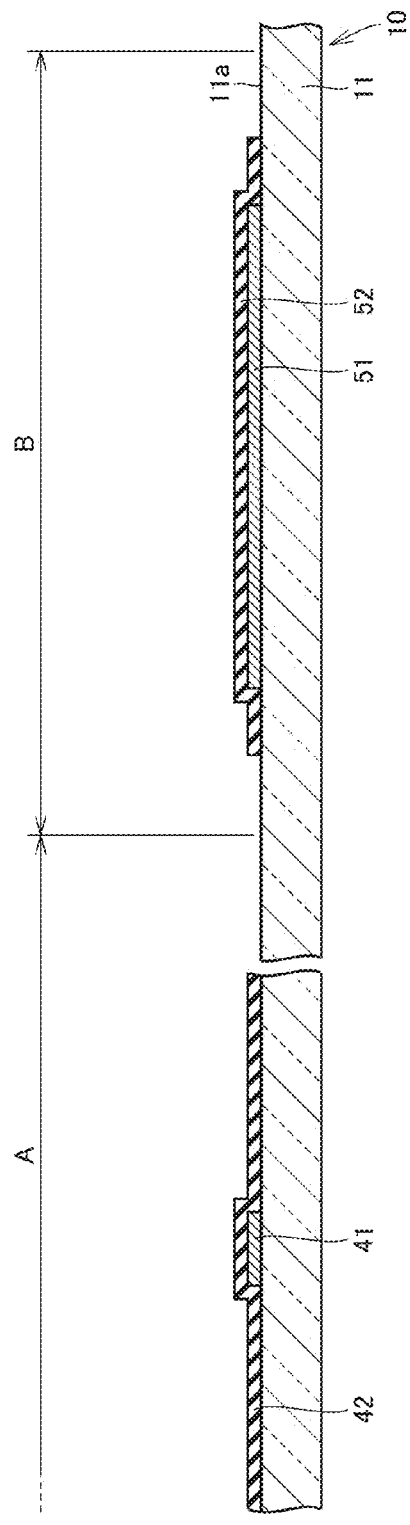
FIG. 5B is a schematic cross-sectional view in the production process in a case where a liquid crystal panel is manufactured according to the method of manufacturing a liquid crystal panel in one embodiment of the present invention.

Then, as shown in FIG. 5B, an insulating film is formed on main surface 11a of glass substrate 11 and patterned. Thus, gate insulating film 42 of TFT 40 is formed in portion A serving as the liquid crystal display portion and protective insulating film 52 in marking pad 50 is formed in peripheral portion B. More specifically, a silicon nitride film is formed on main surface 11a of glass substrate 11, for example, with PECVD (Plasma Enhanced Chemical Vapor Deposition), and the silicon nitride film is patterned with photolithography to thereby form gate insulating film 42 and protective insulating film 52.

Then, as shown in FIG. 6A, an amorphous silicon layer is formed on main surface 11a of glass substrate 11 and patterned or the like. Thus, first semiconductor layer 43 and second semiconductor layer 44 are formed in portion A serving as the liquid crystal display portion and the first semiconductor layer serving as first coating film 53 and the second semiconductor layer serving as second coating film 54 are formed in peripheral portion B. Here, second semiconductor layer 44 and second coating film 54 are in such a shape as covering the entire main surface of first semiconductor layer 43 and the entire main surface of first coating film 53, respectively, and they are formed by implanting ions into an upper portion of the amorphous silicon layer by making use of an ion implantation method as appropriate. It is noted that dry etching using, for example, $CF_4+O_2$, $CCl_4+O_2$, $SF_6$, or the like can be made use of as an etching process in patterning.

Then, as shown in FIG. 6A, a metal film is formed on main surface 11a of glass substrate 11 and patterned. Thus, source electrode 45a and drain electrode 45b of TFT 40 are formed in portion A serving as the liquid crystal display portion and third coating film 55 is formed in peripheral portion B. More specifically, an aluminum film is formed on main surface 11a of glass substrate 11, for example, with sputtering, and the aluminum film is patterned with photolithography to thereby form source electrode 45a, drain electrode 45b, and third coating film 55. It is noted that dry etching using, for example, $BCl_3+Cl_2$, $CF_4(+O_2)$ or the like can be made use of as an etching process in photolithography.

Then, as shown in FIG. 6A, using source electrode 45a and drain electrode 45b as a mask, second semiconductor layer 44 is etched and patterned, so that a channel portion is formed in first semiconductor layer 43. It is noted that dry etching using, for example, $CF_4+O_2$, $CCl_4+O_2$, $SF_6$, or the like can be made use of as an etching process in patterning.

Then, as shown in FIG. 6B, a portion corresponding to marking region C in protective insulating film 52 and first to third coating films 53 to 55 formed in peripheral portion B is etched away, to thereby form a recess 57 having the main surface of the metal film serving as lower layer 51 as a bottom surface. Thus, the main surface of lower layer 51 in the portion corresponding to marking region C is exposed.

Figure 7A:
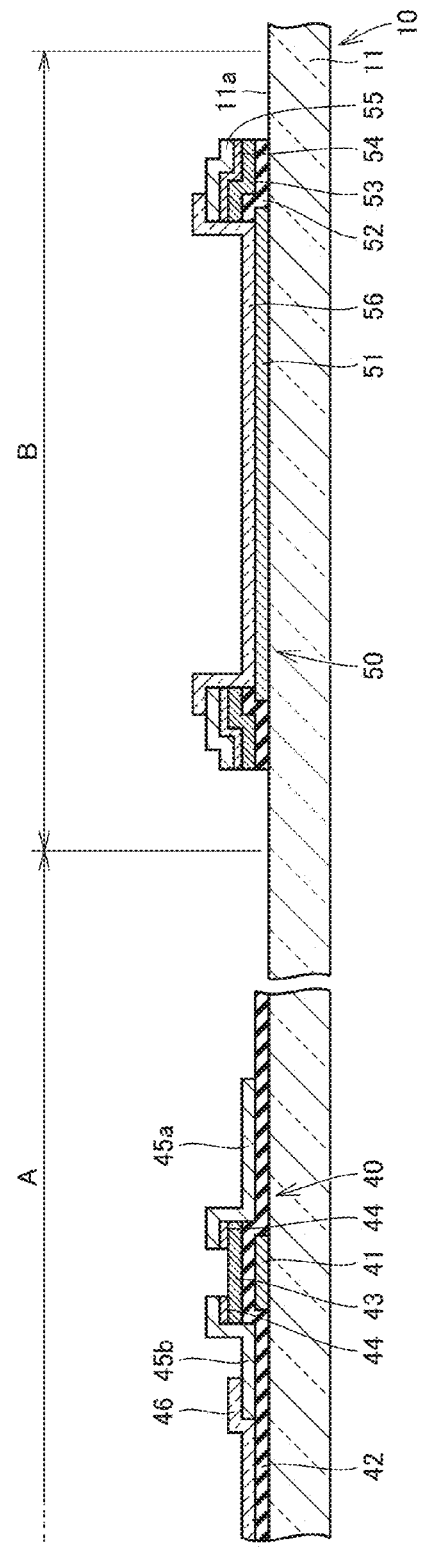
FIG. 7A is a schematic cross-sectional view in the production process in a case where a liquid crystal panel is manufactured according to the method of manufacturing a liquid crystal panel in one embodiment of the present invention.

Then, as shown in FIG. 7A, an ITO film is formed on main surface 11a of glass substrate 11 and patterned, so that pixel electrode 46 electrically connected to TFT 40 is formed in portion A serving as the liquid crystal display portion and upper layer 56 in marking pad 50 is formed in peripheral portion B. More specifically, the ITO film is formed on glass substrate 11, for example, with sputtering, and the ITO film is patterned with photolithography to thereby form pixel electrode 46 and upper layer 56. It is noted that wet etching using, for example, $HCl+HNO_3$ or the like can be made use of as an etching process in photolithography.

Thereafter, an orientation film is formed on main surface 11a of portion A of glass substrate 11 serving as the liquid crystal display portion. Fabrication of TFT substrate 10 is completed as above.

Figure 7B:
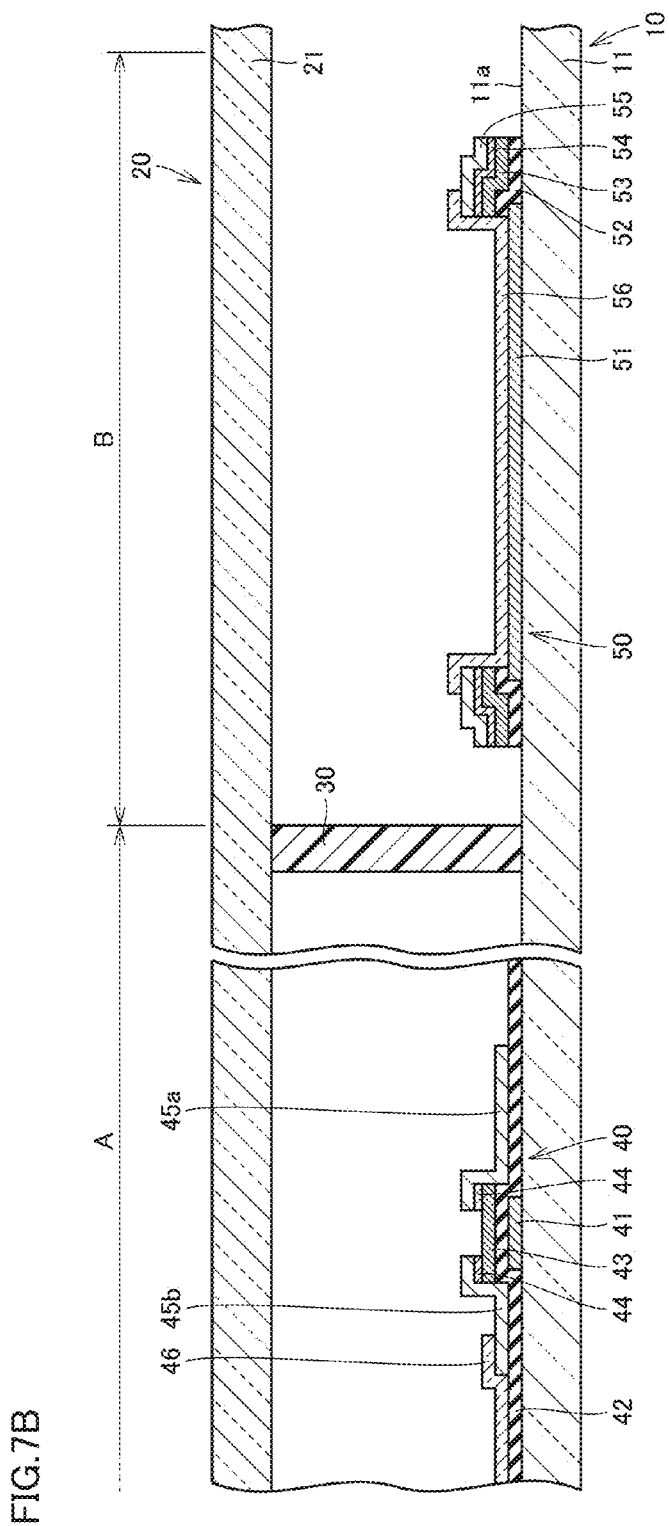
FIG. 7B is a schematic cross-sectional view in the production process in a case where a liquid crystal panel is manufactured according to the method of manufacturing a liquid crystal panel in one embodiment of the present invention.

In succession, as shown in FIG. 4, TFT substrate 10 fabricated in step S101 and CF substrate 20 fabricated in step S102 are bonded to each other (step S103). Specifically, as shown in FIG. 7B, sealing member 30 is arranged to surround portion A of TFT substrate 10 serving as the liquid crystal display portion, CF substrate 20 is positioned in contact with this sealing member 30 to be arranged opposed to TFT substrate 10, and sealing member 30 is cured. Thus, TFT substrate 10 and CF substrate 20 are bonded to each other. Here, a thermosetting sealing material, a photo-curing sealing material, combination thereof, or the like can be made use of as sealing member 30 to be used.

In the method of manufacturing a liquid crystal panel in the present embodiment, both of glass substrate 11 serving as a base member for TFT substrate 10 and glass substrate 21 serving as a base member for CF substrate 20 are fabricated from a mother glass substrate. Therefore, after CF substrate 20 is bonded to TFT substrate 10, a portion of CF substrate 20 not serving as the liquid crystal display portion is located opposed to peripheral portion B of TFT substrate 10 not serving as the liquid crystal display portion. Namely, CF substrate 20 is arranged opposed to the main surface of marking region C in marking pad 50 formed in peripheral portion B of TFT substrate 10 not serving as the liquid crystal display portion, at a distance therefrom.

In succession, as shown in FIG. 4, a laser marking process is performed by emitting laser beams (step S104). Specifically, as shown in FIG. 8, marking region C in marking pad 50 is irradiated with laser beams 100 through CF substrate 20 from the CF substrate 20 side. For example, fundamentals (having a wavelength of 1064 nm) or the like of $YVO_4$ laser represented by general YAG (yttrium-aluminum-garnet) laser beams or neodymium-added YAG laser beams are suitably made use of as emitted laser beams 100. Thus, upper layer 56 and lower layer 51 constituting marking region C in marking pad 50 in the portion irradiated with laser beams 100 are locally heated and they sublime, so that through hole 58 penetrating upper layer 56 and lower layer 51 is formed.

Thereafter, as shown in FIG. 4, various steps such as the step of pouring liquid crystal 32 are performed (step S105). In succession, TFT substrate 10 and CF substrate 20 are divided along a division line E1 shown in FIG. 8 (step S106) and CF substrate 20 is divided along a division line E2 shown in FIG. 8, to thereby remove an unnecessary portion (step S107). Manufacturing of liquid crystal panel 1 shown in FIGS. 1 and 3 is completed as above.

By manufacturing liquid crystal panel 1 according to the method of manufacturing a liquid crystal panel in the present embodiment described above, the metal film serving as lower layer 51 in marking pad 50 that has already been formed can always be protected by protective insulating film 52 during an etching process or a film deposition process performed on TFT substrate 10 for fabricating TFT 40. Therefore, corrosion and deterioration of lower layer 51 in marking pad 50 by an etching gas, an etchant or the like during the etching process or the film deposition process can reliably be prevented.

In addition, by manufacturing liquid crystal panel 1 according to the method of manufacturing a liquid crystal panel in the present embodiment, marking of high definition can be provided even though marking pad 50 provided on TFT substrate 10 is irradiated with laser beams 100 through CF substrate 20 (that is, the multiple-substrate process is performed). Here, high definition means such definition as suited for a case where information is read by using a reflection camera or a transmission camera, and it specifically means that a shape or a size of through hole 58 formed by irradiation with laser beams 100, a degree of darkening around through hole 58, or the like is suited for detection. Namely, in a case where formed marking is of low definition, reading error of a two-dimensional data code occurs when information is read with a reflection camera or a transmission camera, which is such an error as reading of information different from original information. In a case where formed marking is of high definition as in the present embodiment, however, reading error does not occur and information is correctly read.

Therefore, by manufacturing liquid crystal panel 1 according to the method of manufacturing a liquid crystal panel in the present embodiment, the multiple-substrate process described above can be performed so that two effects of efficient production of liquid crystal panels and reduction in cost obtained by adopting the multiple-substrate process are achieved.

In addition, by manufacturing liquid crystal panel 1 according to the method of manufacturing a liquid crystal panel in the present embodiment, the multiple-substrate process can be adopted while realizing marking of high definition. Therefore, since a space in which liquid crystal 32 is to be sealed in the laser marking process is already in a state isolated from the outside including peripheral portion B by means of sealing member 30, introduction as foreign matters into the space, of various films forming marking region C in marking pad 50 that sublime in the laser marking process can be prevented, and hence yield can also be improved.

Moreover, by implementing the constructions of TFT substrate 10 and liquid crystal panel 1 including the same in the present embodiment, the glass substrate for a liquid crystal panel including marking pad 50 suited for laser marking and the liquid crystal panel including the glass substrate can be obtained. Therefore, by manufacturing liquid crystal panel 1 including TFT substrate 10, the liquid crystal panel from which various types of information such as serial information and information on use thereof can accurately be read can be obtained.

Though a mechanism with which marking of high definition can be provided according to the method of manufacturing a liquid crystal panel in the present embodiment is unclear, one of the reasons may be as follows. Namely, it is considered that, in a case of a multiple-substrate process according to the conventional method, a TFT substrate and a CF substrate are arranged in proximate to each other with a small gap of approximately 5 μm, which leads to such a situation that an area around a marking pad becomes a substantially hermetically sealed space, a film forming the marking pad is less likely to sublime, and heat generated by irradiation with laser beams is confined in the space, which causes discoloration around the through hole and resulting difficulty in providing marking of high definition. It is considered, however, that, by performing the laser marking process according to the method of manufacturing a liquid crystal panel in the present embodiment, the marking pad is formed of a stack constituted only of a metal film and an ITO film, so that thermal influence on a portion of the marking pad in the vicinity is optimized, sublimation of the metal film and the ITO film constituting the marking pad is promoted, and confinement of heat in the substantially hermetically sealed space is also suppressed, and consequently marking of high definition is realized.

Figure 9A:
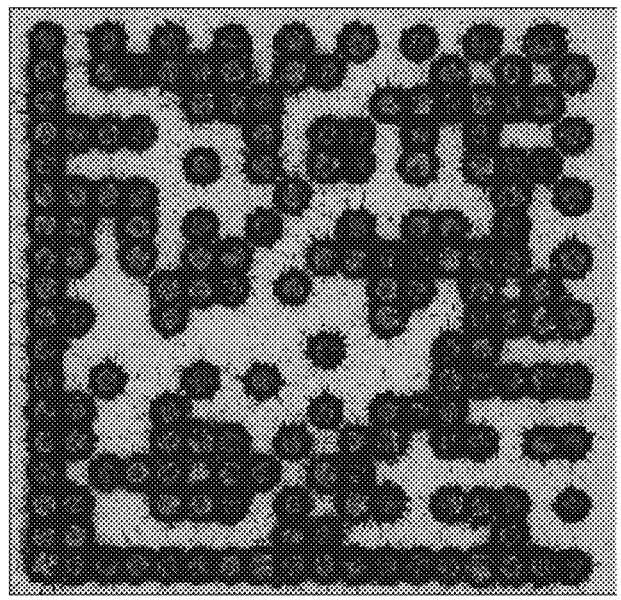
FIG. 9A is an enlarged photograph showing one example of a marking pad subjected to a laser marking process in a multiple-substrate process with the present invention being applied.
Figure 9B:
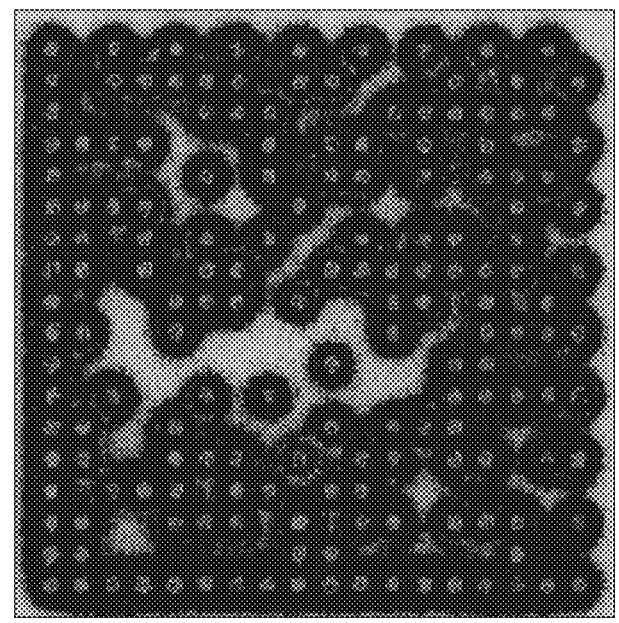
FIG. 9B is an enlarged photograph showing one example of a marking pad subjected to a laser marking process in a multiple-substrate process without the present invention being applied.

FIG. 9A is an enlarged photograph showing one example of a marking pad subjected to a laser marking process in a multiple-substrate process with the present invention being applied, and FIG. 9B is an enlarged photograph showing one example of a marking pad subjected to a laser marking process in a multiple-substrate process without the present invention being applied. Referring to these enlarged photographs, it is understood that, even in a case where the multiple-substrate process is adopted, marking definition such as a size and a shape of a through hole and a degree of darkening around the through hole can be maintained high by applying the present invention, whereas marking definition becomes low when the present invention is not applied.

In addition, the present inventor has found that a film construction according to the invention of the present application (that is, a two-layered film construction of metal film/ITO film) is optimal, by verifying how definition of marking varies if a film construction of a marking pad is variously changed based on adoption of a multiple-substrate process. In verification by prototyping other film constructions (for example, a two-layered film construction of metal film/insulating film, a three-layered film construction of metal film/insulating film/metal film, a three-layered film construction of metal film/insulating film/ITO film, and the like), satisfactory results could not be obtained in any case.

FIG. 10 is a flowchart for illustrating another example of a method of manufacturing a liquid crystal panel in the present embodiment, and FIG. 11 is a schematic cross-sectional view in a production process in a case where a liquid crystal panel is manufactured according to another example of the method of manufacturing a liquid crystal panel in the present embodiment.

In the method of manufacturing a liquid crystal panel in the present embodiment described above, a case where a laser marking process is performed with what is called a multiple-substrate process being adopted has been described. The present invention, however, is naturally applicable to what is called a single-substrate process. In the following, a case where the present invention is applied to the single-substrate process will be described as another example of the method of manufacturing a liquid crystal panel in the present embodiment with reference to FIGS. 10 and 11.

As shown in FIG. 10, in another example of the method of manufacturing a liquid crystal panel in the present embodiment, initially, fabrication of TFT substrate 10 (step S201) and fabrication of CF substrate 20 paired with TFT substrate 10 (step S202) are concurrently performed. A specific process involved with fabrication of this TFT substrate 10 and a specific process involved with fabrication of CF substrate 20 are both the same as in the method of manufacturing a liquid crystal panel in the present embodiment described above.

Then, as shown in FIG. 10, a laser marking process is performed by emitting laser beams to TFT substrate 10 of which fabrication has been completed (step S203). Specifically, as shown in FIG. 11, marking region C in marking pad 50 is irradiated with laser beams 100 from the main surface side of TFT substrate 10 having marking pad 50 formed. For example, fundamentals (having a wavelength of 1064 nm) or the like of YVO$_4$ laser represented by general YAG laser beams or neodymium-added YAG laser beams are suitably made use of as emitted laser beams 100. Thus, upper layer 56 and lower layer 51 constituting marking region C in marking pad 50 in the portion irradiated with laser beams 100 are locally heated and they sublime, so that through hole 58 penetrating upper layer 56 and lower layer 51 is formed.

In succession, as shown in FIG. 10, TFT substrate 10 subjected to the laser marking process in step S203 and CF substrate 20 fabricated in step S202 are bonded to each other (step S204), details of which are the same as in the present embodiment described above.

Thereafter, as shown in FIG. 10, various steps such as the step of pouring liquid crystal 32 are performed (step S205). In succession, TFT substrate 10 and CF substrate 20 are divided (step S206) and in addition CF substrate 20 is divided to thereby remove an unnecessary portion (step S207). Manufacturing of liquid crystal panel 1 shown in FIGS. 1 and 3 is completed as above.

In a case where liquid crystal panel 1 is manufactured according to another example of the method of manufacturing a liquid crystal panel in the present embodiment described above as well, an effect substantially the same as in manufacturing liquid crystal panel 1 according to the method of manufacturing a liquid crystal panel in the present embodiment described above can be obtained. Namely, corrosion and deterioration of lower layer 51 of marking pad 50 during the etching process or the film deposition process for fabricating TFT 40 can reliably be prevented and marking of high definition can be provided in marking pad 50.

Figure 12:
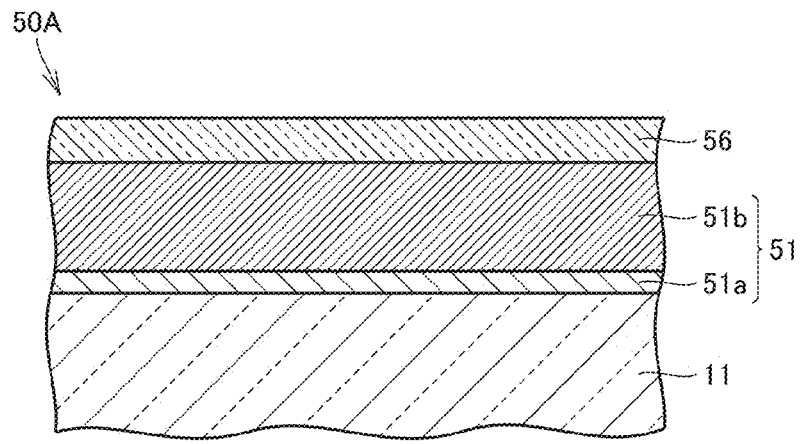
FIG. 12 is a schematic cross-sectional view of a marking pad according to a first variation.
Figure 13:
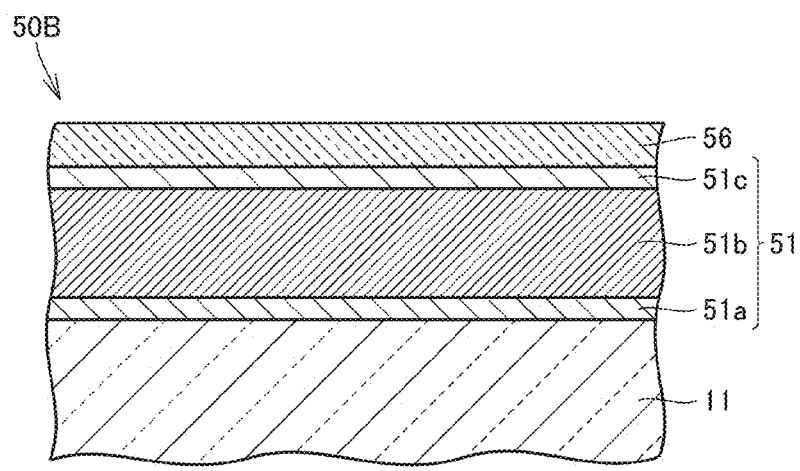
FIG. 13 is a schematic cross-sectional view of a marking pad according to a second variation.

FIGS. 12 and 13 are schematic cross-sectional views of marking pads according to first and second variations, respectively. In both of marking pads 50A and 50B according to these first and second variations, a metal film forming lower layer 51 in marking region C in marking pad 50 in the present embodiment described above is formed from a film stack.

As shown in FIG. 12, in the first variation, lower layer 51 in marking region C in marking pad 50A is formed, for example, from a two-layered film stack of a first metal film 51a and a second metal film 51b formed to cover a main surface of first metal film 51a. First metal film 51a and second metal film 51b are formed by successively forming metal films different in material with sputtering or the like, in forming lower layer 51 in marking pad 50A. In this case, a main surface of second metal film 51b may be subjected to anodization treatment.

For example, a tantalum film is suitably made use of as first metal film 51a, and for example, an aluminum film or a copper film is suitably made use of as second metal film 51b. In this case as well, lower layer 51 in marking region C in marking pad 50A formed from the two-layered film stack and gate electrode 41 of TFT 40 described above are simultaneously formed, and the metal film forming gate electrode 41 of TFT 40 is also formed as the two-layered film stack having the construction described above.

As shown in FIG. 13, in the second variation, lower layer 51 in marking region C in marking pad 50B is formed, for example, from a three-layered film stack of first metal film 51a, second metal film 51b formed to cover a main surface of first metal film 51a, and a third metal film 51c formed to cover a main surface of second metal film 51b. First metal film 51a, second metal film 51b and third metal film 51c are formed by successively forming metal films different in material with sputtering or the like, in forming lower layer 51 in marking pad 50B. In this case, a main surface of third metal film 51c may be subjected to anodization treatment.

For example, a tantalum film is suitably made use of as first metal film 51a, for example, an aluminum film or a copper film is suitably made use of as second metal film 51b, and for example, a tantalum film is suitably made use of as third metal film 51c. In this case as well, lower layer 51 in marking region C in marking pad 50B formed from the three-layered film stack and gate electrode 41 of TFT 40 described above are simultaneously formed, and the metal film forming gate electrode 41 of TFT 40 is also formed as the three-layered film stack having the construction described above.

According to the first and second variations described above as well, effects the same as in the present embodiment described above can be obtained.

One embodiment above and the variations thereof disclosed herein are illustrative and non-restrictive in every respect. The technical scope of the present invention is defined by the claims, and is intended to include any modifications within the scope and meaning equivalent to the terms of the claims.

REFERENCE SIGNS LIST

1 liquid crystal panel; 2 information recording portion; 10 TFT substrate; 11 glass substrate; 11a main surface; 20 CF substrate; 21 glass substrate; 30 sealing member; 32 liquid crystal; 40 TFT; 41 gate electrode; 42 gate insulating film; 43 first semiconductor layer; 44 second semiconductor layer; 45a source electrode; 45b drain electrode; 46 pixel electrode; 50, 50A, 50B marking pad; 51 lower layer; 51a first metal film; 51b second metal film; 51c third metal film; 52 protective insulating film; 53 first coating film; 54 second coating film; 55 third coating film; 56 upper layer; 57 recess; 58 through hole; 60 character data portion; 100 laser beam; A portion serving as liquid crystal display portion; B peripheral portion; C marking region; D peripheral region; and E1, E2 division line.

The invention claimed is:

1. A method of manufacturing a liquid crystal panel, comprising the steps of:

preparing a glass substrate for a liquid crystal panel including a portion serving as a liquid crystal display portion and a peripheral portion not serving as the liquid crystal display portion;

forming a gate electrode of a TFT (Thin Film Transistor) in said portion serving as the liquid crystal display portion and forming a lower layer of a marking pad in said peripheral portion by forming and patterning a metal film on a main surface of said glass substrate for a liquid crystal panel;

forming a gate insulating film of the TFT in said portion serving as the liquid crystal display portion and forming a protective insulating film in contact with said lower layer so as to cover said lower layer of said marking pad in said peripheral portion by forming and patterning an insulating film on the main surface of said glass substrate for a liquid crystal panel;

performing various film deposition processes and patterning processes in said portion serving as the liquid crystal display portion and in said peripheral portion while a state that said lower layer of said marking pad is covered with said protective insulating film is maintained;

exposing a main surface of said lower layer of said marking pad except for its periphery by removing a part of said protective insulating film and at least a part of various films formed thereon;

forming a pixel electrode in said portion serving as the liquid crystal display portion and an upper layer of said marking pad to be in contact with said lower layer so as to cover the main surface of said lower layer of said marking pad in a portion not covered with said protective insulating film in said peripheral portion, by forming and patterning an ITO (Indium Tin Oxide) film on the main surface of said glass substrate for a liquid crystal panel; and providing marking by providing a through hole penetrating said upper layer and said lower layer of said marking pad by irradiating said marking pad with laser beams.

2. The method of manufacturing a liquid crystal panel according to claim 1, wherein said step of forming a gate electrode and a lower layer of a marking pad includes the step of successively stacking and forming a plurality of metal films different in material.

3. The method of manufacturing a liquid crystal panel according to claim 1, further comprising the step of subjecting respective main surfaces of said gate electrode and said lower layer of said marking pad to anodization treatment.

* * * * *